Aug. 4, 1925.  1,548,730
G. E. MIRFIELD
METHOD AND APPARATUS FOR MILLING THREADS
Original Filed Jan. 26, 1921   3 Sheets-Sheet 1
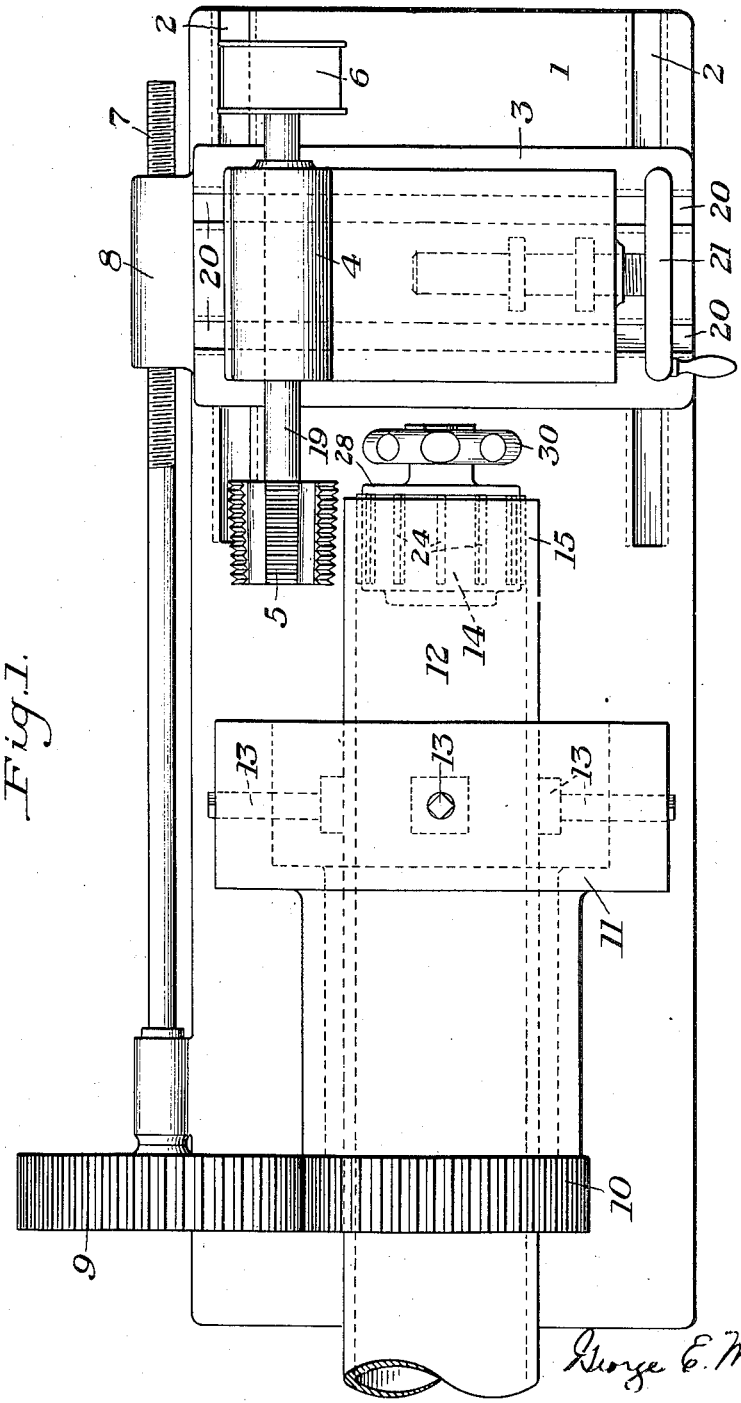

Aug. 4, 1925.
G. E. MIRFIELD
1,548,730
METHOD AND APPARATUS FOR MILLING THREADS
Original Filed Jan. 26, 1921     3 Sheets-Sheet 2
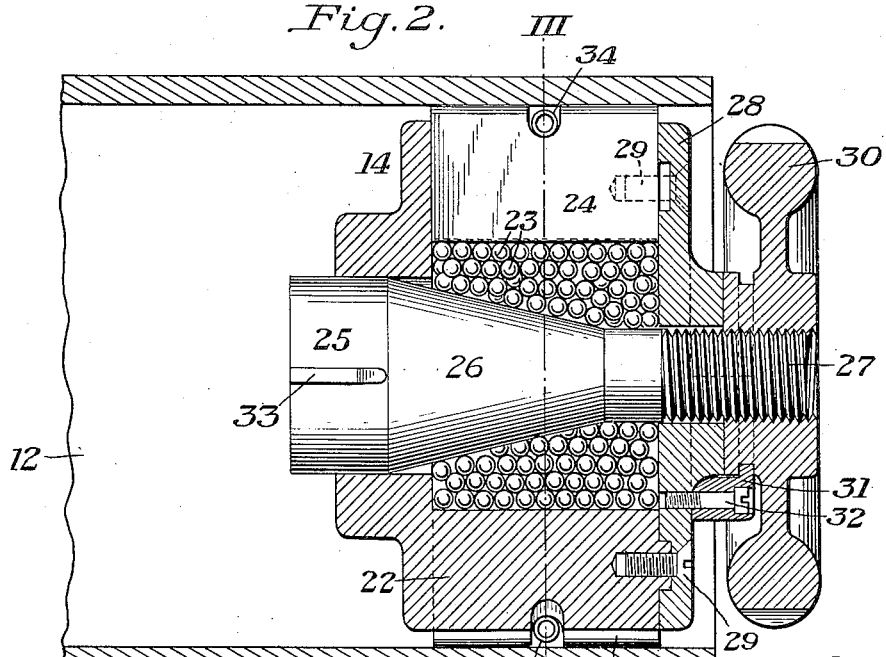
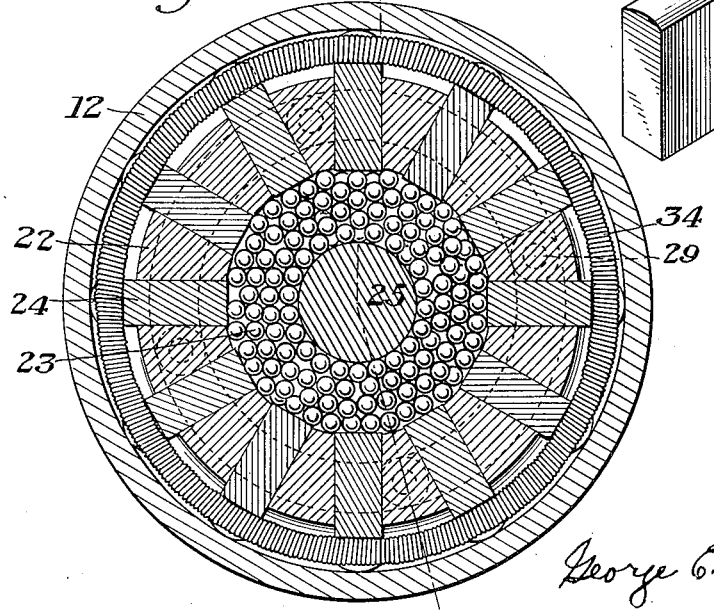

Aug. 4, 1925. 1,548,730
G. E. MIRFIELD
METHOD AND APPARATUS FOR MILLING THREADS
Original Filed Jan. 26, 1921 3 Sheets-Sheet 3
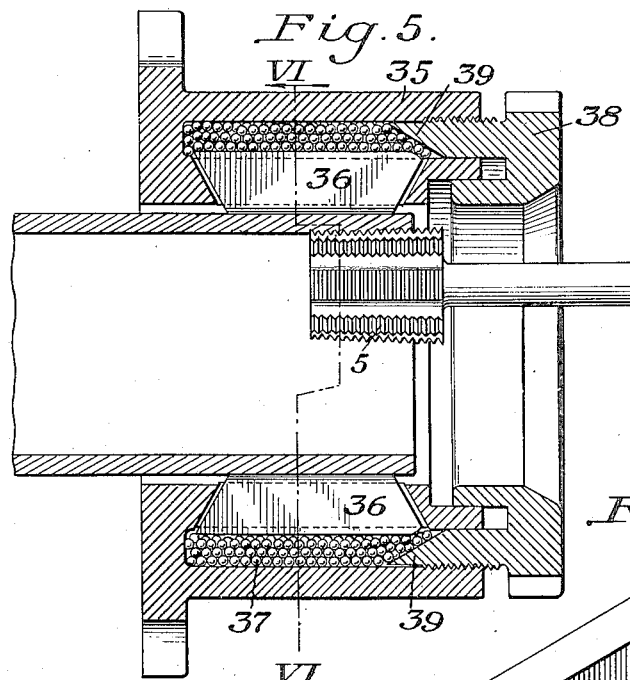
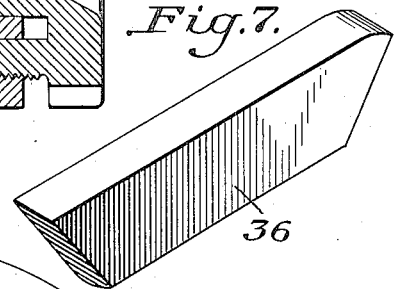
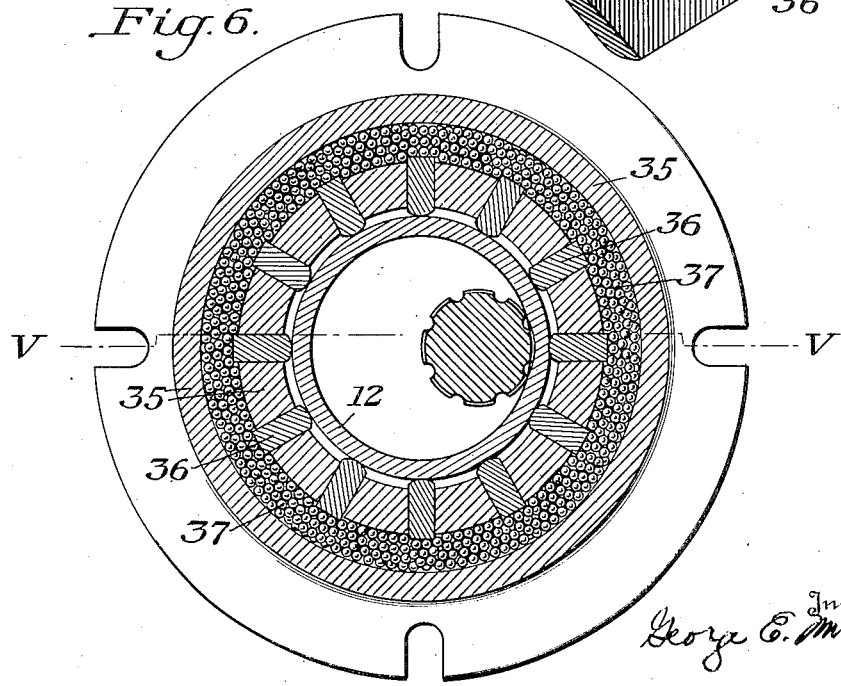

Patented Aug. 4, 1925.

1,548,730

UNITED STATES PATENT OFFICE.

GEORGE E. MIRFIELD, OF YOUNGSTOWN, OHIO.

METHOD AND APPARATUS FOR MILLING THREADS.

Application filed January 26, 1921, Serial No. 439,959. Renewed December 27, 1924.

*To all whom it may concern:*

Be it known that I, GEORGE E. MIRFIELD, a citizen of the United States, residing at Youngstown, in the county of Mahoning and State of Ohio, have invented a new and useful Improvement in Methods and Apparatus for Milling Threads, of which the following is a full, clear, and exact description.

My invention relates to a method of and apparatus for supporting a surface against a pressure which if applied to such a surface when unsupported or otherwise supported, would cause a deflection or distortion of said surface.

In numerous instances and in various operations upon metal and other surfaces, it is essential that such surfaces be maintained in the normal position or condition whether that be regular or irregular, curved or flat, in order that the desired operation may be accurately carried out.

My invention may be used with beneficial effect in the milling of threads on pipe and in many other operations, as for instance, in pipe threading machines, lathes, boring mills, broaching machines and other press work, and in many other instances presenting similar difficulties and problems. The above are given merely as examples.

I have illustrated and will herewith explain my invention as applied to a method and apparatus for milling threads on pipes by the use of a hob.

Heretofore in the use of a hob for milling threads on pipes, a mechanically expanded mandrel has been introduced into the portion of the pipe to be threaded and expanded, with the result that the pipe, which in many instances is not truly circular, is further distorted by reason of the fact that the expanding members of the mandrel are moved a substantially equal distance. When a thread is produced or other operation performed under these circumstances, and the expanding mandrel is removed from the pipe, the pipe assumes its normal condition, and therefore the thread on the pipe takes the same configuration as the normal configuration of the pipe, with the result that when it is attempted to thread the pipe into a coupling which may have a different configuration, trouble is encountered either in the difficulty of threading the pipe into the coupling, or in a faulty joint after the pipe is screwed into the coupling, or both. The difficulties above enumerated, among others, are serious and cause considerable trouble in the commercial threading of pipes and also in the use of such pipes in the trade.

It is an object of my invention to produce a thread of true circular configuration on a pipe or other similar article, regardless of the configuration of the article, and to produce this thread on the article while maintained in its natural condition, that is to say, without changing its configuration as has been done heretofore.

Another object of my invention is the production of means for accomplishing the above object in a rapid and accurate manner.

The principles employed in carrying out the above objects may be easily employed in other specific instances.

One of the important elements in the apparatus for accomplishing the above objects is the surface-supporting device which I have devised and which takes the form of an expanding mandred in Figures 1 and 3, and which lends itself peculiarly to the carrying out of the method herein described, as applied to milling threads on pipes.

The principles of my invention may be used in many other embodiments, one of which is shown in Figures 5 and 6.

My invention will be better understood by reference to the following description taken in connection with the accompanying drawings forming a part hereof, and in which:

Figure 1 is a plan view of a thread milling machine, shown largely conventional, with my invention applied thereto;

Figure 2 is a longitudinal section on the line II—II of Figure 3, showing the expanding mandrel placed in position in the end of a pipe;

Figure 3 is a cross sectional view on line III—III of Figure 2;

Figure 4 is a perspective view of one of the expanding members of the mandrel;

Figure 5 is a longitudinal section of a chuck applied to a pipe, and showing the hob in operative position;

Figure 6 is a cross sectional view on line VI—VI of Figure 5;

Figure 7 is a perspective view of one of the expanding members of the chuck.

The thread milling machine shown in Figure 1 is of ordinary construction and is represented in Figure 1 largely conventional. The construction and operation of such a machine is well known in the art, and a detailed description thereof will therefore be unnecessary. The essential features of the machine are as follows: a base 1 having longitudinal guides 2 therein, and a carrier 3 upon which is mounted the holder 4 for the hob 5. The hob may be rotated by a belt applied to the pulley 6. The carrier 3 is reciprocated in the guides 2 by a feed screw 7, which has threads thereon of the same pitch as the threads to be placed on the pipe or other article. The feed screw 7 meshes with threads on a portion 8 of the carrier 3. On the other end of the feed screw 7 is a gear 9 which meshes with a gear 10 on a hollow extension of a chuck 11, of any desired construction. The gears 9 and 10 are of the same diameter so as to give a one-to-one ratio. The pipe 12 upon which the threads are to be produced is held in position by the members 13 of the chuck in the usual manner. The expanding mandrel 14, which will later be described in detail, is inserted in the interior of the portion 15 of the pipe to be threaded. When treating articles of large diameters suitable means may be provided for assisting the operator in handling the mandrel 14. Ordinarily the mandrel is handled by hand and supporting means are not necessary. Many arrangements may be made if such means are desired.

The carrier 3 is provided with guideways 20 in which the holder for the hob 5 is adapted to move. The movement of the holder 4 in the guides 20 is produced by the hand wheel 21 in a well known manner.

The expanding mandrel shown in Figures 2, 3 and 4 comprises a carrier 22 provided with a chamber which is filled with small steel balls 23. These balls are preferably small in diameter and constitute a medium in the chamber, which medium has hydraulic characteristics or those of a non-compressible fluid; that is to say, the medium is non-compressible and exerts equal unit pressure in all directions when pressure is applied to the medium.

The carrier 22 is provided with a plurality of radial openings in each of which is placed an expanding member 24. The members 24 are preferably of the same size and length, and are preferably proportioned with respect to the carrier as indicated in Figure 3, and are free to move either out wardly or inwardly in response to the resultant of pressure. The means for applying pressure to the medium 23 is a member 25 having a cylindrical section at one end thereof and a conical portion 26. One end of the member 25 is threaded at 27 and extends through a suitable opening in a cover plate 28, which is held in place by screws 29. The hand wheel 30 is internally threaded and screwed onto the threads 27. A retaining member 31 engages a groove in the hub of the wheel 30. This member is held in position by screw 32 and acts to hold the wheel 31 in position when it is rotated to move the member 25 to the left. The cylindrical portion of the member 25 is provided with a guide 33 which engages a corresponding guideway in the carrier 22 to prevent rotation of the member 25. Pressure is created on the medium 23 by turning the hand wheel 30 and drawing the member 25 to the right, as shown in Figure 2, into the chamber in the carrier 22. This causes a corresponding proportional outward radial movement of the expanding members 24. The expanding members 24 are prevented from falling out of the openings in the carrier 22 by reason of the coiled spring 34 which encircles the mandrel as shown in Figure 3.

Figures 5, 6, and 7 show a chuck embodying the essential features of the expanding mandrel shown in Figures 2, 3, and 4. The mandrel is useful when it is desired to place threads on the outside of the pipe, while the chuck shown in Figures 5 to 7 is useful in the production of threads on the interior of the pipe or coupling. The chuck comprises a carrier 35 provided with a plurality of radial openings in which are placed expansion members 36. The form of the members 36 is shown in detail in Figure 7. The carrier 35 is provided with a chamber in which is placed the medium comprising the balls 37. One end of the carrier 35 is internally screw-threaded. A member 38 is correspondingly threaded and may be screwed into the carrier for the purpose of producing a pressure on the medium 37. The member 38 is provided with a tapered portion 39 which produces an effect similar to that produced by the member 25 in the expanding mandrel.

The principle of operation of the expanding mandrel and the chuck as shown in Figures 2 to 4, inclusive, and 5 to 7, inclusive, respectively, is the same, and from a description of the operation of one of said devices, the operation of the other will be apparent.

When the mandrel, shown in Figures 2 and 3, is placed inside of a pipe, for example, and the hand wheel 30 is rotated so as to draw the member 25 into the chamber and place a pressure on the medium 23, each of the expansion members 24 moves outwardly until it comes into contact with the interior surface of the pipe. As soon as a member 24 comes into contact with the pipe it is halted in its movement until all of the other members 24 likewise engage the surface of the pipe. This is true regardless of the configuration of the pipe. As soon as all of the members 24 have engaged the pipe, a further rotation of the hand wheel will produce a uniform pressure on the expansion members 24 per unit area, which will therefore tend to move each of said members correspondingly. By reason of this condition, the configuration of the pipe is not altered in any manner, but is rigidly maintained in its normal condition. The same condition exists when a pipe is held on the exterior by means of the chuck shown in Figures 5 to 7, inclusive. That is to say, the pipe is held rigidly in its normal condition, and its normal configuration is maintained.

The operation of a machine as shown in Figure 1 in the carrying out of my method, is as follows: The pipe 12 is placed in position in the chuck 11, which may be of the form shown in Figure 1 or may be of the form shown in Figures 5 to 7, inclusive. The mandrel 14 is inserted in the end of the pipe 12 or other portion to be threaded, and the hand wheel 30 is rotated so as to support the pipe as above explained, that is, to maintain its normal condition without changing the normal configuration of the pipe. The hob is then set into rotation after being placed in the relative position shown in Figure 1, and is then gradually moved radially inward by clockwise rotation of the hand wheel 21. This movement of the hob is continued until grooves have been cut into the pipe a distance equal to the depth of the thread to be cut therein. When this position of the hob is reached, the gear 10 is rotated by any suitable means, which in turn rotates the chuck 11, the pipe 12, and also the mandrel 14. As soon as the pipe 12 begins to rotate, the hob is moved longitudinally of the pipe by reason of the gear 9 and feed screw 7. When the pipe 12 has been rotated one revolution, the hob will have moved longitudinally of the pipe a distance equal to the pitch of the thread to be produced on the pipe. By reason of this feeding movement and the plurality of milling members on the hob, a plurality of portions of the thread on the pipe 12 is produced simultaneously, and upon the completion of one revolution of the pipe 12 the various portions of the thread are united to form a continuous thread on the pipe, of a definite predetermined pitch.

Before starting the threading operation, the point of minimum radius of the pipe is ascertained, and the threading operation is begun at the point of minimum radius so that upon the completion of the operation the thread will be complete for at least a part of the threaded portion, in accordance with the well known and standard gauge for threads. The form of the thread, its pitch, and other characteristics, will be in accordance with standard practice, and the shape and nature of the hob will be such as to produce the desired thread, and will be in accordance with standard practice for thread milling operations.

The production of a thread on the interior of a pipe or coupling is in all respects the same in principle as heretofore described, it being understood of course that the hob in the initial radial movement in that case would be outward instead of inward as in the case of placing an external thread on the pipe.

My invention has the advantages that a true circular thread is produced regardless of the configuration of the article threaded, and with the consequent advantages that when two articles which have been threaded by my method and apparatus are placed together the threads fit each other with accuracy. From these advantageous come the advantages of ease of application in the trade, uniformity of result, with the ultimate desirable result of a perfect joint.

My method and apparatus are effective in the production of a true circular thread on a pipe having eccentric portions, whether this eccentricity comes from a variation in the radius of the pipe at various points, or whether it comes from a slight bend in the pipe between the point on the pipe where it is held by the chuck and the portion of the pipe which is being threaded.

Many other advantages of my invention will be apparent to those skilled in the art, from a reading of the foregoing description.

While I have described my invention in its preferred form, I desire it to be understood that I am not to be limited to the exact details shown and described, as many minor changes may be made in the apparatus without departing from the spirit of my invention. Furthermore I have shown my invention as applied to thread milling machines, but it is by no means limited to such application. It may be applied to many kinds of machines and in fact it is useful in any instance where the walls of the surface being operated upon have not sufficient inherent rigidity to resist the force of the operating tool without flexing or being distorted.

I claim:

1. The method of supporting a surface against threading pressure which consists in maintaining a counter pressure equally at a plurality of points on said surface through a medium having hydraulic characteristics, substantially as described.

2. The method of maintaining the surface of an article in its normal condition when subjected to a threading force sufficient to overcome the inherent rigidity of the article which consists in maintaining an equal counter pressure at a plurality of points and acting in opposite directions through a common medium, substantially as described.

3. The method of maintaining the surface of an article in its normal condition when subjected to a threading force sufficient to distort the surface if unsupported which consists in maintaining an equal counter pressure at a plurality of points acting in different directions, the counter pressure at said points being applied through a common medium having hydraulic characteristics, substantially as described.

4. The method of threading an article end which consists in inserting an expanding mandrel having hydraulic characteristics into the portion of the article to be threaded without changing the cross section of such portion, applying a hob to the exterior of said article and moving said hob radially inward a distance equal to the depth of the thread, and rotating said article one revolution while in contact with said hob, substantially as described.

5. In a device of the character described, the combination of a carrier having a chamber therein, a plurality of pressure members in communication with said chamber, a medium in said chamber having hydraulic characteristics, and rigid means movable in said chamber for exerting equal unit pressure on said pressure members through said medium, substantially as described.

6. In a device of the character described, the combination with a carrier and a plurality of supporting members, which are mounted in said carrier for separate expansion and contraction, of means movably cooperating with said carrier for simultaneously applying pressure to all of said members to move the same uniformly or independently, substantially as described.

7. In a device of the character described, the combination with a carrier and a plurality of supporting members which are mounted in said carrier for separate radial expansion and contraction, of means movable axially of the carrier for simultaneously applying substantially equal unit pressure to all of said members to move the same uniformly or independently, substantially as described.

8. In a device of the character described, a cylindrical member having a chamber and a plurality of radial openings therein, a member in each opening adapted to move freely in a radial direction, a medium in said chamber having the characteristics of a non-compressible fluid, and means for decreasing the effective area of said chamber for placing a pressure on said medium, substantially as described.

9. In a device of the character described, the combination of a cylindrical member having a plurality of radial openings therein, a movable member in each of said openings, and means movable axially of said member for applying a force uniformly to each of said movable members regardless of its radial position, substantially as described.

10. In a device of the character described, the combination of a member having a chamber therein and a plurality of openings leading from said chamber, a movable member in each of said openings, a medium in said chamber having the characteristics of a non-compressible fluid, and means for decreasing the effective area of said chamber for applying a pressure to said medium, substantially as described.

11. In the method of performing a cutting operation on one surface of a hollow article having an irregular contour, the steps consisting in uniformly and rigidly supporting one surface of said article without distortion thereof and in a manner to prevent distortion thereof due to the threading force, and then performing the cutting operation in opposition to the supporting pressure, substantially as described.

12. The herein described method of threading an article of generally circular outline but having transverse axes of different lengths, comprising directly and rigidly supporting that portion of the article to be threaded in its normal shape to establish a counterpressure effective for preventing distortion under the threading pressure, and then threading the article to produce a thread having a uniform pitch diameter throughout its entire length, substantially as described.

13. The herein described method of threading an article of generally circular outline but having transverse axes of different lengths, comprising directly and rigidly supporting that portion of the article to be threaded in its normal shape to establish a counterpressure effective for preventing distortion under the threading pressure, and then subjecting the surface of the article to a plurality of simultaneous cutting operations, substantially as described.

14. The herein described method of threading an article of generally circular outline but having transverse axes of different lengths, comprising directly and rigidly supporting that portion of the article to be threaded in its normal shape to establish a counterpressure effective for preventing distortion under the threading pressure, and then subjecting the surface of the article to a plurality of simultaneous cutting operations all of which are started at the point on the periphery of the portion being threaded having the minimum radius, substantially as described.

15. In a device of the character described, a carrier, a plurality of supporting members mounted in said carrier for separate movement, a medium of constant volume having characteristics of a non-compressible fluid and with which said members are in communication, and means for displacing said medium to apply pressure to said members, substantially as described.

In testimony whereof, I have hereunto set my hand.

GEORGE E. MIRFIELD.